United States Patent [19]

Sakakibara et al.

[11] Patent Number: 4,788,233

[45] Date of Patent: Nov. 29, 1988

[54] EPOXY RESIN COMPOSITION

[75] Inventors: Toshimori Sakakibara, Shiga; Takahiro Nakano, Ashiya; Tatsuya Okuno, Otsu, all of Japan

[73] Assignee: Sunstar Giken Kabushiki Kaisha, Takatsuki, Japan

[21] Appl. No.: 122,220

[22] Filed: Nov. 18, 1987

[30] Foreign Application Priority Data

Nov. 27, 1986 [JP] Japan .................................. 61-283818

[51] Int. Cl.[4] .......................... C08L 63/10; C08K 5/51; C08K 5/41; C08K 5/10

[52] U.S. Cl. .................................... 523/400; 523/437; 523/438; 523/451; 523/453; 523/455; 523/456; 523/467

[58] Field of Search ............... 523/400, 437, 438, 451, 523/453, 455, 456, 467; 525/529, 530, 119, 122

[56] References Cited

U.S. PATENT DOCUMENTS

| | | | |
|---|---|---|---|
| 3,649,583 | 3/1972 | Guthrie | 523/455 |
| 3,925,297 | 12/1975 | Sprengling | 523/453 |
| 3,926,903 | 12/1975 | Scola | 523/437 |
| 4,119,592 | 10/1978 | Murphy | 523/455 |

Primary Examiner—Lewis T. Jacobs
Attorney, Agent, or Firm—Wegner & Bretschneider

[57] ABSTRACT

A modified epoxy resin composition having improved flexibility which comprises a reaction product of an epoxy resin and a synthetic rubber reactive with an epoxy resin in the presence of a nonionic or anionic surfactant, which has uniform and stable dispersion state of the rubber in epoxy resin without increase of viscosity. The epoxy resin composition is useful as a material for adhesives and coating agents.

6 Claims, No Drawings

EPOXY RESIN COMPOSITION

This invention relates to an epoxy resin composition, more particularly to a composition of an epoxy resin modified with a synthetic rubber in the presence of a nonionic or anionic surfactant, by which the synthetic rubber is included in the epoxy resin in the uniform and stable dispersion state while preventing the composition from becoming of high viscosity, and hence, the epoxy resin composition is easily handled.

TECHNICAL BACKGROUND AND PRIOR ART

Epoxy resins have generally excellent dimension stability, mechanical strength, electrical characteristics and further excellent heat resistance, water resistance, chemical resistance, and hence have widely been used for adhesives and coating materials. However, the epoxy resins are usually inferior in flexibility and hence have disadvantageously less peel strength, by which the products prepared therefrom show breaking and peeling during use or processing thereof, and further, in case of a molded product, it is easily broken by giving thereto impact.

From this viewpoint, it has hitherto been tried to improve the flexibility of epoxy resins by various measurements. For instance, it is known that an epoxy resin is reacted with a synthetic rubber which is reactive with an epoxy resin in the presence of a catalyst such as triphenylsulfone, tertiary amines (e.g. dimethylbenzylamine, etc.), tetra-n-butylammonium iodide, and the like (cf. "Zairyo", Vol. 34, No. 384, pages 1099-1104, September 1975, Atsushi Murakami et al, "Phase Separated Structure and Mechanical Properties of Rubber-Modified Epoxy Resins"). Although the modified epoxy resin thus obtained shows satisfactory peel strength and impact strength, the reaction is very unstable and is poorly reproducible because the peel strength of the resin varies depending on each lot of the synthetic rubber and difference of the reaction amount. Moreover, the reaction product has a very high viscosity and hence it is hard to handle.

OBJECT OF THE INVENTION

The present inventors have intensively studied the improvement of flexibility of epoxy resins and have found that when a nonionic or anionic surfactant is used in stead of the catalyst in the above known method, or alternatively when the reaction is carried out in an absence of a catalyst and thereafter said surfactant is added to the reaction mixture, the synthetic rubber particles are incorporated into the epoxy resin in the uniformly dispersed state (in good emulsified state), and thereby, the reaction product shows excellent stability with less variation of peel strength, and further, the reaction product has a suitable viscosity and hence is easily handled.

An object of the invention is to provide an improved epoxy resin composition having excellent stability and uniformity and having suitable viscosity to be easily handled. Another object of the invention is to provide an improved composition of an epoxy resin which is modified with a synthetic rubber. A further object of the invention is to provide an improved process for the production of a synthetic rubber-modified epoxy resin composition which is characteristic in the use of a nonionic or anionic surfactant in order to produce the reaction product of an epoxy resin and a synthetic rubber in the stable and uniform state. These and other objects and characteristics of the invention will be apparent to those skilled in the art from the following description.

DETAILED DESCRIPTION OF THE INVENTION

The epoxy resin composition of the invention comprises a reaction product of an epoxy resin and a synthetic rubber which is reactive with the epoxy resin and a nonionic or anionic surfactant.

The epoxy resin includes any kind of conventional epoxy resins, and the most suitable epoxy resin is selected from the conventional ones in accordance with the desired utilities of the final product. Sutable examples of the epoxy resin are condensation reaction products of epichlorohydrin and a polyhydric alcohol or polyhydric phenol (particularly bisphenol A), cyclohexane oxide epoxy resins, cyclopentane oxide epoxy resins, epoxy resins derived from diolefin or polyolefin or a copolymer thereof, epoxy resins prepared by copolymerization of glycidyl methacrylate and a vinyl compound, epoxy resins prepared from a glyceride of a high unsaturated fatty acid, and the like.

The synthetic rubber which is reactive with an epoxy resin includes synthetic rubbers having a functional group reactive with an epoxy group (e.g. carboxyl group, hydroxy group, amino group, etc.) at the terminus or within the molecular chain of the rubber, for example, urethane rubber, polysulfide rubber, butadine rubber, acrylonitrilebutadiene rubber, chloroprene rubber, isoprene rubber, styrene-butadine rubber, which have such a functional group as mentioned above. The synthetic rubbers are used in an amount of 2 to 100 parts by weight, preferably 10 to 50 parts by weight, to 100 parts by weight of the epoxy resin. When the amount of the synthetic rubber is less than 2 parts by weight, the desired modification of the epoxy resin can not be achieved, and on the other hand, when the amount is over 100 parts by weight, the native properties of the epoxy resin tends to be disadvantageously deteriorated.

The surfactant used in this invention includes nonionic and anionic surfactants which function as a catalyst for the reaction between the epoxy resin and the synthetic rubber and can stabilize the state of the resulting dispersion of reaction product of the epoxy resin and synthetic rubber and prevent development of high viscosity. Suitable examples of the nonionic surfactant are fatty acid monoglycerides, fatty acid polyglycolates, fatty acid sorbitan esters, fatty acid sucrose esters, fatty acid alkanolamide, polyoxyethylene fatty acid esters, polyoxyethylene fatty acid amide condensation products, polyoxyethylene aliphatic alcohol ethers, polyoxyethylene aliphatic thioalcohol ethers, polyoxyethylene alkylphenol ethers (e.g. polyoxyethylene nonylphenol ether, etc.), polyoxyethylene polyoxypropylene condensation products, and the like. Suitable examples of the anionic surfactant are carboxylate type surfactants (e.g. rosin soup, etc.), sulfonate type surfactants (e.g. sodium dodecylbenzenesulfonate, etc.), sulfate type surfactants (e.g. sodium laurylsulfate, etc.), phosphate type surfactants, phosphonate type surfactants, and the like. These surfactants are used alone or in combination of two or more thereof. The surfactants are usually used in an amount of 1 to 20 parts by weight, preferably 5 to 10 parts by weight, per 100 parts by weight of the epoxy resin. When the amount of the surfactant is less than 1 part by weight, it is not effective for prevention of high viscosity of the reaction product, and on the other hand, when the amount is over 20 parts by weight, the epoxy resin tends to show lower water resistance.

The epoxy resin composition of this invention can be prepared by reacting an epoxy resin and a synthetic rubber reactive with the epoxy resin in the prescribed amount as mentioned above and then incorporating therein an surfactant, or alternatively by reacting an epoxy resin and a synthetic rubber in the presence of a surfactant. The reaction is usually carried out at a temperature of from room temperature to 200° C., preferably from 70° to 150° C., for a period of time of from 30 minutes to 24 hours.

The epoxy resin composition of this invention is useful as a material for adhesives and coating agents. In the use of the composition as an adhesive or coating agent, it is used in a combination with a curing agent. The curing agent includes various types of conventonal curing agents, such as a curing agent which is curable at room temperature (it is used in the form of so-called "two-pack" type composition) or a curing agent which is curable with heating (it is used in the form of so-called "one-pack" type composition). Suitable examples of the curing agent are carboxylic anhydrides, imidazole derivatives, dicyandiamide or a derivative thereof, carboxylic acid dihydrazides, urea derivates, polyamidoamines, modified polyamines, fluorinated boron-monoethylamine complex, and the like. The composition of this invention may optionally be incorporated with other conventional additives, such as fillers, reactive diluents, solvents for resin, rust preventives, dyestuffs and pigments, antioxidants, and the like.

This invention is illustrated by the following Examples and Reference Examples but should not be construed to be limited thereof.

EXAMPLES 1 and 2 and REFERENCE EXAMPLE 1

Epoxy resin composition

An epoxy resin and a synthetic rubber reactive with an epoxy resin are reacted in amounts as shown in Table 1 in the presence of a catalyst at 120° C. for 3 hours to give an epoxy resin composition. After cooling to 20° C., the viscosity of the composition is measured. The results are shown in Table 1.

Preparation of an adhesive

To each epoxy resin composition (100 parts by weight) are added dicyandiamide (5 parts by weight), 2-phenyl-4-methyl-5-hydroxymethylimidazole (Curezole 2P 4 NHZ, manufactured by Shikoku Kasei Kogyo K.K.) (8 parts by weight) and silicic anhydride (Aerosil, manufactured by Nippon Aerosil K.K.) (5 parts by weight) to give a one-pack adhesive.

Adhesion test

The adhesives thus prepared were tested as to shear strength and peel strength under the following conditions.

Measurement of shear strength:
Material to be adhered: a steel plate SPCC-SD (thickness 1.6 mm×width 25 mm×lengh 100 mm)
Lapping length: 12.5 mm
Curing conditions: 180° C. for 30 minutes
Measuring conditions: 5 mm/minute, 20° C.

Measurement of peel strength:
Material to be adhered: a steel plate SPCC-SD (thickness 0.8 mm×width 25 mm×length 150 mm)
Lapping length: 100 mm
Curing conditions: 180° C. for 30 minutes
Measuring conditions: 180° peeling angle, 50 mm/minute, at 20° C.

TABLE 1

| | Ex. 1 | Ex. 2 | Ref. Ex. 1 |
|---|---|---|---|
| Epoxy resin*1 (part by weight) | 75 | 75 | 75 |
| Synthetic rubber reactive with epoxy resin*2 (part by weight) | 25 | 25 | 25 |
| Catalyst (part by weight): | | | |
| Nonionic surfactant*3 | 3 | — | — |
| Anionic surfactant*4 | — | 3 | — |
| Tolylphenylsulfone | — | — | 3 |
| Viscosity (20° C., PS) | 3000 | 3200 | 4200 |
| Shear stength (kg/cm$^2$) | 290 | 295 | 290 |
| Peel strength (kg/25 mm) | 25.0 | 24.0 | 20.5 |

[Notes]:
*1 Epikote 828, manufactured by Yuka Shell Epoxy K.K.
*2 An acrylonitrile-butadiene rubber, the terminus of which are modified by carboxylation (Hicar CTBN 1300 × 31, manufactured by Goodrich Co.)
*3 Polyoxyethylene nonylphenol ether (Nonipole NP400, manufactured by Sanyo Chemical Industries, Ltd.)
*4 Polyethylene glycol ether sulfuric acid ester (Nissan Trax K-40, manufactured by Nippon Oil and Fats Co., Ltd.)

What is claimed is:

1. An epoxy resin composition which comprises a reaction product of 100 parts by weight of an epoxy resin and 2 to 100 parts by weight of a synthetic rubber reactive with the epoxy resin and incorporated in the reaction product 1 to 20 parts by weight of a nonionic or anionic surfactant.

2. The composition according to claim 1, wherein the amount of the synthetic rubber is in the range of 10 to 50 parts by weight.

3. The composition according to claim 1, wherein the amount of the surfactant is in the range of 5 to 10 parts by weight.

4. The composition according to claim 1, wherein the reaction product of an epoxy resin and a synthetic rubber is prepared by reacting the epoxy resin and the synthetic rubber reactive with an epoxy resin in the presence of a nonionic or anionic surfactant at a temperature of 70° to 150° C.

5. A process for preparing an epoxy resin composition, which comprises reacting 100 parts by weight of an epoxy resin with 2 to 100 parts by weight of a synthetic rubber reactive with an epoxy resin in the presence of 1 to 20 parts by weight of a nonionic or anionic surfactant.

6. A process for preparing an epoxy resin composition, which comprises reacting 100 parts by weight of an epoxy resin with 2 to 100 parts by weight of a synthetic rubber and incorporating in the reaction product 1 to 20 parts by weight of a nonionic or anionic surfactant.

* * * * *